US006975422B2

(12) United States Patent
Kurz et al.

(10) Patent No.: US 6,975,422 B2
(45) Date of Patent: *Dec. 13, 2005

(54) METHOD FOR PROVIDING INFORMATION FOR A CUSTOMER REPLACEABLE UNIT

(75) Inventors: Karl E. Kurz, Rochester, NY (US); Daniel A. Chiesa, Webster, NY (US); Tom W. Claessens, Venray (NL)

(73) Assignee: Xerox Corporation, Stamford, CT (US)

( * ) Notice: Subject to any disclaimer, the term of this patent is extended or adjusted under 35 U.S.C. 154(b) by 984 days.

This patent is subject to a terminal disclaimer.

(21) Appl. No.: 09/740,505

(22) Filed: Dec. 19, 2000

(65) Prior Publication Data

US 2002/0075500 A1 Jun. 20, 2002

(51) Int. Cl.$^{7}$ .............................................. G06F 15/00

(52) U.S. Cl. ......................... 358/1.16; 399/12; 399/13; 399/24; 399/25; 399/27; 347/7

(58) Field of Search ......................... 358/1.16; 399/13, 399/25, 12; 347/7

(56) References Cited

U.S. PATENT DOCUMENTS

| | | | | |
|---|---|---|---|---|
| 3,409,901 | A | 11/1968 | Dost et al. | 346/74 |
| 4,468,112 | A | 8/1984 | Suzuki et al. | 355/14 D |
| 4,847,659 | A | 7/1989 | Resch, III | 355/202 |
| 4,908,666 | A | 3/1990 | Resch, III | 355/246 |
| 4,922,294 | A | 5/1990 | Nakagami et al. | 355/209 |
| 4,961,088 | A | 10/1990 | Gilliland et al. | 355/206 |
| 5,204,698 | A | 4/1993 | LeSueur et al. | 346/160 |
| 5,204,699 | A | 4/1993 | Birnbaum et al. | 346/160 |
| 5,272,503 | A | 12/1993 | LeSueur et al. | 355/208 |
| 5,283,613 | A | 2/1994 | Midgley, Sr. | 355/203 |
| 5,636,032 | A | 6/1997 | Springett | 358/296 |
| RE35,751 | E | 3/1998 | Midgley | 399/25 |
| 5,918,085 | A | 6/1999 | Rollins et al. | 399/27 |
| 6,016,409 | A | 1/2000 | Beard et al. | 399/33 |
| 6,106,088 | A | 8/2000 | Wafler | 347/7 |
| 6,108,099 | A | 8/2000 | Ohtani | 358/1.15 |
| 6,113,208 | A | 9/2000 | Benjamin et al. | 347/7 |
| 6,158,837 | A | 12/2000 | Hilton et al. | 347/19 |
| 6,181,885 | B1 | 1/2001 | Best et al. | 399/12 |
| 6,233,408 | B1 | 5/2001 | Allen | 399/8 |
| 6,333,790 | B1 | 12/2001 | Kageyama | 358/1.15 |
| 6,584,290 | B2 * | 6/2003 | Kurz et al. | 399/12 |
| 2001/0003827 | A1 * | 6/2001 | Shimamura | 709/206 |

FOREIGN PATENT DOCUMENTS

| | | |
|---|---|---|
| EP | 0 838 768 A3 | 4/1998 |
| EP | 9 838 768 A2 | 4/1998 |

* cited by examiner

*Primary Examiner*—Edward Coles
*Assistant Examiner*—Mark R. Milia
(74) *Attorney, Agent, or Firm*—Andrew D. Ryan

(57) ABSTRACT

A method and information system for informing a user about consumable components such as a CRU using printed documents in an electrostatographic system.

20 Claims, 2 Drawing Sheets

METHOD FOR PROVIDING INFORMATION FOR A CUSTOMER REPLACEABLE UNIT

BACKGROUND OF THE INVENTION

Reference is made to application, Ser. No. 09/740,603, now U.S. Pat. No. 6,584,290, entitled, SYSTEM FOR PROVIDING INFORMATION FOR A CUSTOMER REPLACEABLE UNIT, filed concurrently herewith, and the disclosure of which is totally incorporated herein by reference.

FIELD OF THE INVENTION

The present invention is directed to a method for informing a user of the status and characteristics of a product such as a consumable product. More specifically, the present invention is directed to a method for notifying a user, via a printing operation, that a customer replaceable unit (CRU) should be reordered. The method provides ready accessibility to a variety of information to aid the user in purchasing a replacement cartridge, bottle, printhead, or photoreceptor.

A user may be informed when a marking material in a CRU is at a level too low to confidently print any further jobs. Once a user is signaled of a problem, a further problem is that, at a time of recognized need, the user may not have the necessary information readily in their possession in order to make a decision with respect to a replacement CRU. For example, the user may not possess the manufacturer's recommended CRU replacement model, the user may not know where to order the CRU, the user may not have the CRU manufacturer or vendor(s) contact information, the user may not know how to remove and recycle the CRU, or the user may not know how to install the replacement CRU. Such beneficial information is most useful when a user is notified that a CRU will soon run out of a substance or when the CRU is at or near the end of its useful life.

In view of these problems, the present invention proposes a method and system which provides a user with various useful information concerning the CRU in the form of a printed document. The method and system makes the CRU information available to the user at the source of the problem, and at an identified time of need in the printing machine. The information is provided in one convenient place, in the form of a printed document.

Various monitoring systems are disclosed in U.S. Pat. Nos. 6,106,088; 6,016,409; 5,918,085; 5,636,032; 5,283,613; RE35,751; 5,272,503; 5,204,699; 5,204,698; 4,961,088; 4,908,666; 4,847,659; 4,468,112; and 3,409,901.

All documents cited herein, including the foregoing, are incorporated herein by reference in their entireties.

SUMMARY OF THE INVENTION

The present invention relates to embodiments of a system and methods which provide a user with useful information in the form of a printed document concerning, for example, the status, configuration, or availability of a CRU. The system provides a printed document to a user to identify a problem such as an imminent end of life of the CRU and aids the user in, for example, ordering a replacement CRU.

In aspects of the present invention, there is provided:

A method for providing information to a user comprising: providing a printing machine; installing a replaceable component in the printing machine, the replaceable component including a memory storage device, the memory storage device containing data including an identification code of the replaceable component; electronically transferring at least one of the identification code of the replaceable to the printing machine; and printing a document including at least the identification code of the replaceable component;

A method for ordering a component comprising: providing a printing machine; installing a replaceable unit in the printing machine, the replaceable unit comprising: (a) a container for containing a marking substance used in an printing process in the printing machine, the container having a first volume of substance prior to use in the printing machine and a second volume of substance less than the first volume after use; and (b) a memory storage device functionally associated with the container, the memory storage device including data about the customer replaceable unit; transferring the data in the memory storage device to the printing machine; and upon reaching a threshold volume of substance in the container, printing a human readable document, the human readable document indicating: (a) at least one of a present and future need for a replacement replaceable unit; (b) replaceable unit model information; and (c) replaceable unit order information;

A method for ordering a component comprising: providing a printing machine, the printing machine including a customer replaceable unit comprising a memory storage device, the memory storage device including data about the customer replaceable unit; communicating the data in the customer replaceable unit with the printing machine; and printing a human readable document including the data about the customer replaceable unit after a condition occurs in the customer replaceable unit; and A method for ordering a component for a printing apparatus comprising: providing a replaceable unit including a memory containing data about the replaceable unit; providing a printing apparatus; and printing a document including at least a portion of the data, the data relating to at least one of ordering, returning, using, and installing a replacement replaceable unit.

Still other features, aspects and advantages of the present invention and methods of construction of the same will become readily apparent to those skilled in the art from the following detailed description and the information presented herein. As will be realized, the invention is capable of other and different embodiments and methods of construction, and its several details are capable of modification in various obvious respects, all without departing from the invention. Accordingly, the drawing and description are to be regarded as illustrative in nature, and not as restrictive.

DETAILED DESCRIPTION OF THE INVENTION

Figure 1:
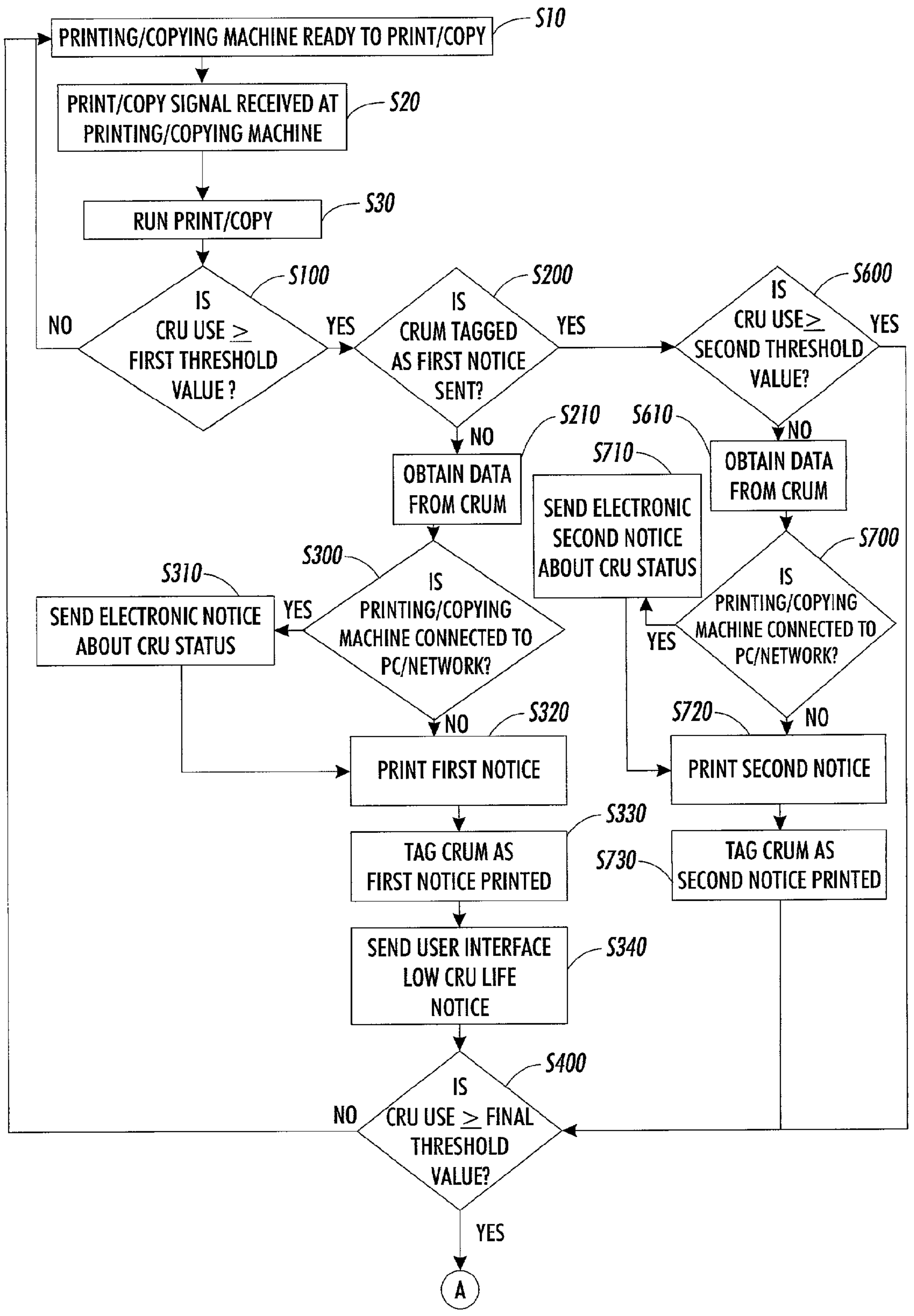
FIG. 1 is a flowchart illustrating a process carried out by a system of the present invention.
Figure 2:
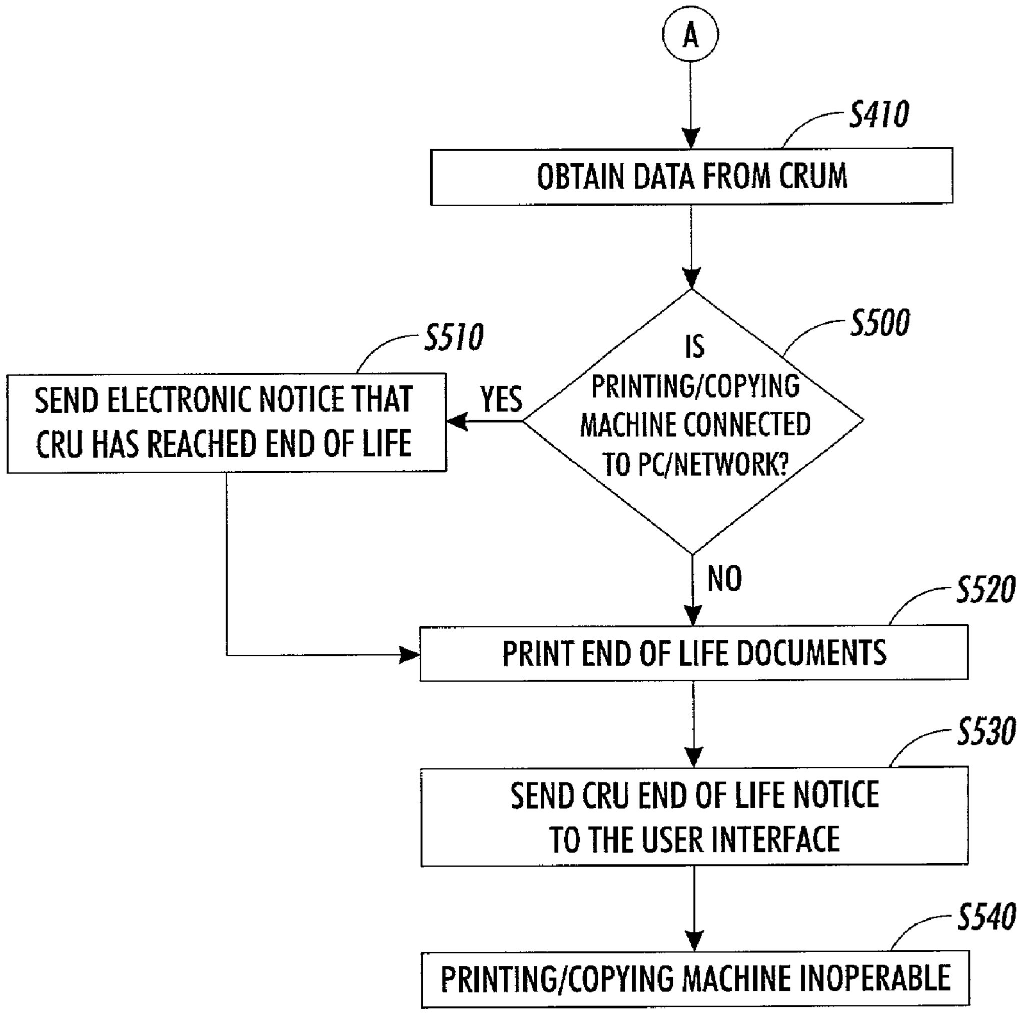
FIG. 2 is an extension of the flowchart of FIG. 1 illustrating a further process carried out by a system of the present invention.

The present invention relates to embodiments of a method and system for aiding a user in recognition of a problem in the CRU(s) and for providing the user with a printed document including information to solve the problem. While the principles of the present invention will be described in connection with a printing machine, copying machine, or combination thereof, such as an electrostatographic machine, it should be understood that the present invention is not limited to that embodiment or to that application. Therefore, it is should be understood that the principles of the present invention extend to all alternatives, modifications, and equivalents as may be included within the spirit and scope of the appended claims.

In operation, as an indication is made that a new CRU should be ordered based on, for example, events, image count, pixel count, or sensors, a machine prints a document with predetermined information about the CRU for the user to use. In addition, the document can be sent electronically to the user at a personal computer.

A printing or copying machine may comprise replaceable CRU(s) such as a photoreceptor cartridge, a developer cartridge, a toner cartridge, an ink cartridge, printhead, and print cartridge each of which is generally designed to function for a preset number of images in the form of prints or copies. The photoreceptor cartridge includes a photoreceptor drum. The developer cartridge includes a development system and receives a toner cartridge. The toner cartridge includes a sump for toner. The ink cartridge includes ink. The print cartridge may include at least one ink container fluidly connected to at least one printhead. The printhead ejects ink onto a print medium such as paper in controlled patterns of closely spaced dots. The printhead may be sealingly attached to the ink container and the combined printhead and container form a cartridge.

Each CRU includes a memory device such as a customer replaceable unit monitor (CRUM) integral therewith. Each CRUM may include multiple memories of different types. To enable the CRUM to be electrically connected and disconnected with the printing machine on installation or removal of the CRU, contact pads are provided. Terminal blocks and a terminal board may be used to complete the electrical connection between the CRUM and a control unit of the printing machine.

Various electronic memory systems may be used in the CRUM including ROM, RAM, EEPROM, magnetic, or optical. Data relating to the CRU may be stored in a memory on the CRUM. For example, a preset number of total images for the CRU, various threshold(s) values of use for notice for the CRU, and various predetermined information to aid the user may be programmed into the CRUM by the manufacturer. The CRUM may include addressable memory for storing various information about the CRU. The CRUM may have a number of programmed thresholds ranging from one to several hundred, although less than ten thresholds, such as one to five thresholds for the CRU are envisioned. The thresholds for the CRU may be set at various values. In addition, the CRUM may be updated, for example, with a count of events in which the CRU has functioned in by the control unit of the printing machine at the end of each run. For example, each CRUM may be pre-programmed with total images value reflecting the maximum number of images that can be made using the CRU. The total images value may decline as each image is made to provide a current total image count value.

The control unit of the printing machine may include microprocessors and suitable memory, such as Read Only Memory (ROM) and Random Access Memory (RAM) for holding, for example, the operating system software of the printing machine and programming data for operating the various component parts of the printing machine in an integrated fashion to produce prints/copies.

In operation, when the number of remaining images in the CRU reaches a predetermined programmed level, predetermined information about the CRU from the CRUM may be provided in a printed document at the printing machine to aid the user. For example, the predetermined information about the CRU may relate to obtaining, ordering, using, removing, installing, recycling, or combinations thereof. The system is intended to provide sufficient notice of the demise of the CRU at various intervals of use and to allow the user sufficient time, for example, about two weeks to order a replacement CRU using the information readily provided in the printed document. The predetermined information allows the user to solve a problem with respect to the CRU during the life of the CRU. In addition, an electronic e-mail message may be sent to the user, to a User Interface (UI), or to a display window to supplement the printed document.

The notice based on the remaining images with respect to the CRU may be provided at selected intervals or at selected thresholds based on, for example: a percentage of life remaining in the CRU, ranging from 100% to 0%; a number of images remaining for the CRU to function, ranging from about fifty thousand remaining images to one remaining image; and a number of weeks for the CRU to function, ranging from about sixteen weeks to about one week, depending on the users anticipated or average monthly image volume.

After the notice has been provided in a printed document, the printing machine may continue to make the remaining images until a final threshold value is reached in the CRU indicating the CRU is at its end of life. Then, the printing machine may print end of life documents including various predetermined information. Shortly thereafter, the CRU or printing machine is then inoperable. The old CRU must then be removed and replaced by a replacement CRU in order for further operation of the printing machine.

In operation, when the print/copy run process is completed and the printing machine cycles down, the total number of images made during the run may be temporarily stored in a memory of the printing machine. The control unit of the printing machine may read the current image total from the CRUM of each CRU and, using the image run count from the memory of the printing machine, calculate a new current image total for the respective CRUM reflecting the number of images remaining on the CRU. The control unit may then write the new current image total back into the CRUM of each CRU.

The control unit may then compare each new current image total against the remaining images for the CRU and upon the comparison reaching a threshold value, a printed notice including the predetermined information may be printed at the printing machine for the particular CRU. This notification provides useful information about the CRU and may alert the user to the fact that the identified CRU is about to expire and that a new replacement CRU should be made available and installed soon in the printing machine.

Turning now to FIG. 1, illustrated is a process in a system that starts at S10 with a machine that is ready to print/copy. Next, at S20, the 'print/copy start signal' is received at the machine. At S30, the running of the printing/copying process begins at the machine.

At S100, the actual value of the use of the CRU recorded by the machine, such as the number of copies, prints, cycles, or other events involving the CRU, is compared to a first threshold value programmed on the CRUM to determine if the CRU use is greater than or equal to the first threshold value for the CRU. For CRU use that is less than the first threshold value programmed on the CRUM, the machine will return to the ready state. For a value greater than or equal to the first threshold value programmed on the CRUM, S200 is entered.

At S200, the machine software system queries the CRUM for a tag indicating whether a first notice including predetermined CRU information has already been printed at the machine. If the first notice has not already been printed, at S210, the machine software system obtains predetermined data from the CRUM for the first notice and then S300 is entered.

At S300, a determination is made whether the machine is connected to a PC/network or whether the machine is a stand-alone machine.

For machines connected to a PC/network, at S310, an electronic e-mail message is sent to a user(s) indicating the predetermined information, for example, a message indicating low CRU life for a particular CRU along with information for ordering a replacement CRU including identification number and contact information including vendor(s), manufacturer(s), or third parties including their respective address, phone number, facsimile number, e-mail address, Uniform Resource Locator (URL) address, and combinations thereof. Next, at S320, a first notice is printed at the machine indicating, for example, a similar message as in S310. Next, at S330, the CRUM is tagged that a first notice has been printed at the machine. At, S340, the User Interface (UI) of the machine may be signaled with a similar message as in S320.

For stand-alone machines, at S320, a first notice is printed at the machine indicating, for example, information as in S310. Next, at S330, the CRUM is tagged that a first notice has been printed at the machine. At, S340, the User Interface (UI) of the machine may be signaled with a similar message as in S310 or S320.

At S400, a determination is made whether the CRU is at its end of life using the actual value of the use of the CRU recorded by the machine, such as the number of copies, prints, cycles, or other events involving the CRU, compared to a final threshold value programmed on the CRUM to determine if the CRU use is equal to the final threshold value for the CRU. For an actual value greater than or equal to the final threshold value programmed on the CRUM, then the CRU is at its end of life. If the actual use is less than the threshold value then the CRU has usable life and the system returns to the machine ready state. For CRU'(s) at their end of life at S410, the predetermined data from the CRUM is obtained by the machine for an end of life notice and then S500 is entered.

At S500, a determination is made whether the machine is connected to a PC/network or whether the machine is a stand-alone machine.

For machines connected to a PC/network, at S510, an electronic e-mail message is sent to a user/users indicating the predetermined information, for example, a message indicating the CRU has reached end of life for the particular CRU along with information for ordering a replacement CRU including identification number and contact information including vendor(s), manufacturer(s), or third parties including their respective as address, phone number, facsimile number, e-mail address, URL address, or combinations thereof. Next, at S520, an end of life notice is printed at the machine indicating, for example, a similar message as in S510. Next, at S530, the User Interface (UI) of the machine may be signaled with a similar message as in S510 and 520. Next, at S540, the control unit of the machine renders the machine inoperable until a replacement CRU is obtained and replaced in the machine.

For stand-alone machines, at S520, an end of life notice is printed at the machine indicating, for example, information as in S510. Next, at S530, the User Input (UI) panel indicator of the machine may be signaled with a similar message as in S510 and S520. Next, at S540, the control unit of the machine renders the machine inoperable until a replacement CRU is obtained and replaced in the machine.

S600–S610 and S700–S730 are used where additional notices are desired for the user. For example, a series of notices may be programmed into the CRUM or the control unit of the machine to notify the user at various intervals or thresholds during the life of the CRU.

At S600, the actual value of the use of the CRU recorded by the machine, such as the number of copies, prints, cycles, or other events involving the CRU, is compared to a second threshold value programmed on the CRUM to determine if the CRU use is greater than or equal to the second threshold value for the CRU. For CRU use that is less than the first threshold value programmed on the CRUM, the machine will return to the ready state as it would be less then the final threshold value relating to the end of life of the CRU. For a value greater than or equal to the second threshold value programmed on the CRUM, S610 is entered. At S610, the machine software system obtains specific data from the CRUM for the second notice and then S700 is entered.

At S700, a determination is made whether the machine is connected to a PC/network or whether the machine is a stand-alone machine.

For machines connected to a PC/network, at S710, a second electronic e-mail message is sent to a user/users indicating predetermined information for example, a message indicating low CRU life for the particular CRU along with information for ordering a replacement CRU including identification number and contact information including certain vendor(s), manufacturer(s), or third parties including respective address, phone number, facsimile number, e-mail address, URL address, or combinations thereof. Next, at S720, a second notice may be printed at the machine indicating, for example, a similar notice as in S710. Next, at S730, the CRUM is tagged that a second notice has been printed at the machine. The User Interface (UI) of the machine may be signaled with a second notice as in S710 or S720, although an indication of the first notice may remain at the UI and a second notice may be unnecessary.

For stand-alone machines, at S720, a second notice is printed at the machine indicating, for example, information as in S710. Next, at S730, the CRUM is tagged that a second notice has been printed at the machine. The User Interface (UI) of the machine may be signaled with a second notice as in S710 or S720, although an indication of the first notice may remain at the UI and a second notice may be unnecessary.

In operation, at least one notice including predetermined information is provided to the user although a series of notices ranging from two notices to several hundred notices may be made prior to the end of life notice of the CRU, although less than ten notices such as two to five notices are envisioned. Various combinations of CRU information may be programmed as data in the CRUM for inclusion in the notice(s). The notice may be printed at intervals by the machine and include an identification code such as a model number of the CRU and contact information including various content such as: phone number, facsimile number, street address, email address, URL address, vendor(s), manufacturer, removal and replacement instructions, equivalent CRU and respective identification code, warranty information such as notification that the CRU is at or is beyond its warranted life, or combinations thereof. The URL address may be used for ordering, or for obtaining instructions on obtaining or using a replacement CRU.

The CRU may be removably securable in the machine and the machine may automatically print the document after an indication of a threshold condition. The CRU may include a component containing a substance used in a marking process and the CRU may be replaceable in the machine. The CRU may include a consumable substance and/or a wearable part. The document may be in a human readable medium and/or a computer readable medium.

The CRU may include a container having a first volume of a substance prior to use and a second volume of the substance less than the first volume after an increase in use. Upon a threshold occurrence in the CRU, the machine may be disabled other than printing a document including information about the CRU.

Various notices based on the data stored in the CRUM including combinations of information are envisioned. The notice may include information relating to ordering, returning, using, or installing the CRU. The notice may include information for a specific customer. The notice may include information for a geographic market in which the manufacturer has directed the CRU to be destined. The notice may include information for a specific configuration of the CRU. The notice may include information about the manufacturer. The notice may include information about a future disablement of the printing system. The notice may include information in the form of a log of previously printed documents concerning the CRU. The notice may include information relating to a return address for recycling of the CRU. The notice may be in the form of a return label for recycling the CRU. The notice may include information relating to average print area coverage and average print rate for the CRU. The notice may include information relating to a total of the number of prints made using the CRU. The notice may include information relating to warranty information for the CRU. The notice may include information relating to notification of the CRU being used beyond its warranted life. The notice may include information relating to an estimate of the remaining life of the CRU. The notice may include information relating to a percentage of use of at least one of cyan (C) toner, magenta (M) toner, yellow (Y) toner, and black (K) toner in the CRU. The notice may include information relating to the date of manufacture of the CRU. The notice may include information relating to the place of manufacture of the CRU. The notice may include information relating to a replacement instruction of the CRU.

In embodiments of the present invention, various methods and systems are envisioned. For example, the memory storage device may include a contact for ordering a replacement CRU and the printing machine may print a document including at least the identification code of the CRU and a contact for ordering a replacement CRU upon a condition in the CRU. The printing machine may send an electronic mail message including at least one of the identification code of the CRU and a contact for ordering a replacement CRU to a computer. The CRU may be a toner cartridge and the memory storage device may include a contact for ordering a replacement toner cartridge and the printing machine may print a document including at least the identification code of the toner cartridge and a contact for ordering a replacement toner cartridge. The printing machine may print a document including a URL address for electronic ordering of a CRU; or a URL address for obtaining instructions on obtaining a replacement CRU.

In summary, a system is provided for providing a user with various printed information about a CRU used in a printing/copying machine in one convenient location, without the user searching for information about the CRU. The system is suitable for generally any printing/copying machine with CRU(s) requiring replacement. The system provides a simple, low-cost information system for use in an electronic digital printer, digital copier, facsimile machine, and combinations thereof. The system is used to better provide information when it is most needed by a user and to communicate that information to the user at the printing/copying machine where the information is most applicable. The information may be stored on the CRUM. By placing useful data such as an identification code and contact information on the CRUM, the customer will have access to the information via a printed document for ordering. Also, data updates can be made by changing the data on the CRUM as the cartridge is manufactured. The notice(s) provide useful information to the user and allow the user to make decisions with respect to replacing or servicing the CRU. The system can be utilized with digital xerography and with inkjet. Moreover, the system can be readily adapted for both black and white and color environments. In the color environment, the information can be displayed for individual color inks or toners (C, M, Y, K) as well as combined into an overall toner/ink usage.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for providing information to a user comprising:

providing a printing machine;

installing a replaceable component in the printing machine, the replaceable component including a memory storage device, the memory storage device containing data including at least one identification code of the replaceable component;

electronically transferring at least one of the identification code of the replaceable component to the printing machine; and printing a document including information on at least one of recycling and installing the replaceable component.

2. The method of claim 1 wherein the memory storage device further comprises a contact for ordering a replacement replaceable component and printing a document including at least the identification code of the replaceable component and a contact for ordering a replacement replaceable component upon a condition in the replaceable component.

3. The method of claim 2 further comprising sending an electronic mail message including at least one of the identification code of the replaceable component and a contact for ordering a replacement replaceable component to a computer.

4. The method of claim 1 further comprising printing a document including information for at least one of returning, using, and installing the replaceable component.

5. The method of claim 1 further comprising printing a document including information for use in a geographic market in which the replaceable component is destined.

6. The method of claim 1 further comprising printing a document including information identifying a configuration of the replaceable component.

7. The method of claim 1 further comprising printing a document including information for the replaceable component identifying at least one of: (a) manufacturer; (b) vendor;

(c) third party; (d) equivalent apparatus and respective identification code; (e) phone number; and (f) facsimile number.

8. The method of claim 1 wherein the replaceable component is at least one of a toner cartridge, developer cartridge, print cartridge, ink cartridge, printhead, and photoreceptor drum.

9. The method of claim 1 wherein the replaceable component is a toner cartridge and wherein the memory storage device further comprises a contact for ordering a replacement toner cartridge and printing a document including at least the identification code of the toner cartridge and a contact for ordering a replacement toner cartridge.

10. A method for ordering a component comprising:

providing a printing machine;

installing a replaceable unit in the printing machine, the replaceable unit comprising: (a) a container for containing a marking substance used in a printing process in the printing machine, the container having a first volume of substance prior to use in the printing machine and a second volume of substance less than the first volume after use; and (b) a memory storage device functionally associated with the container, the memory storage device including data about the replaceable unit;

transferring the data in the memory storage device to the printing machine; and upon reaching a threshold volume of substance in the container, printing a human readable document, the human readable document indicating: information on at least one of recycling and installing the replaceable unit.

11. A method for ordering a component comprising:

providing a printing machine, the printing machine including a customer replaceable unit comprising a memory storage device, the memory storage device including data about the customer replaceable unit;

communicating the data in the customer replaceable unit with the printing machine; and printing a human readable document including information on at least one of recycling and installing the replaceable unit after a condition occurs in the customer replaceable unit.

12. The method for ordering of claim 11 wherein the data comprises information for at least one of ordering, returning, using, and installing the customer replaceable unit and wherein the document comprises information for at least one of ordering, returning, using, and installing the customer replaceable unit.

13. A method for ordering a component for a printing apparatus comprising:

providing a replaceable unit including a memory containing data about the replaceable unit;

providing a printing apparatus; and printing a document including at least a portion of the data, the data relating to at least one of recycling and installing a replacement replaceable unit.

14. The method of claim 13 wherein the replaceable unit includes a first volume of a substance prior to use and a second volume of the substance less than the first volume after an increase in use.

15. The method of claim 13 further comprising printing a document containing information about a future disablement of the printing apparatus.

16. The method of claim 13 further comprising printing a log of previously printed documents about the replaceable unit.

17. The method of claim 13 further comprising printing at least one of: (a) an identification code for the replaceable unit; and (b) a phone number for ordering a replacement replaceable unit.

18. The method of claim 13 further comprising printing at least one of: (a) a URL address for electronic ordering of a replaceable unit; and (b) a URL address for obtaining instructions on obtaining a replacement replaceable unit.

19. The method for ordering a component of claim 13 further comprising printing at least one of: (a) a return address for recycling of the replaceable unit; and (b) a return label for recycling of the replaceable unit.

20. The method for ordering a component of claim 13 further comprising printing at least one of: (a) warranty information for the replaceable unit (b) notification of the replaceable unit being used beyond its warranted life, (c) date of manufacture of the replaceable unit; (d) pace of manufacture of the replaceable unit; and (e) a replacement instruction for the replaceable unit.

* * * * *